United States Patent
Yoshida

(10) Patent No.: US 11,007,989 B2
(45) Date of Patent: May 18, 2021

(54) BRAKE CONTROL APPARATUS FOR VEHICLE

(71) Applicant: TOYOTA JIDOSHA KABUSHIKI KAISHA, Toyota (JP)

(72) Inventor: Kazuaki Yoshida, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 77 days.

(21) Appl. No.: 16/431,034

(22) Filed: Jun. 4, 2019

(65) Prior Publication Data

US 2019/0381981 A1    Dec. 19, 2019

(30) Foreign Application Priority Data

Jun. 14, 2018  (JP)  .............................. JP2018-113651

(51) Int. Cl.
*B60T 8/1761*  (2006.01)
*B60T 8/172*   (2006.01)
*B60T 8/1763*  (2006.01)

(52) U.S. Cl.
CPC .......... *B60T 8/17613* (2013.01); *B60T 8/172* (2013.01); *B60T 8/17633* (2013.01)

(58) Field of Classification Search
CPC ... B60T 8/17613; B60T 8/17633; B60T 8/176
See application file for complete search history.

(56) References Cited

U.S. PATENT DOCUMENTS

| 3,652,136 A * | 3/1972 | Schlitz ................ B60T 8/17633 303/185 |
| 6,324,461 B1 * | 11/2001 | Yamaguchi ............. B60T 8/172 180/197 |
| 8,825,333 B2 * | 9/2014 | Okubo .................... B60T 8/175 701/74 |
| 9,573,473 B2 * | 2/2017 | Akiyama ............... B60T 8/1766 |
| 9,751,533 B2 * | 9/2017 | Singh ...................... B60T 8/172 |
| 2012/0323459 A1 | 12/2012 | Okubo |
| 2013/0211644 A1 * | 8/2013 | Yokoyama ............ B60W 20/14 701/22 |

FOREIGN PATENT DOCUMENTS

| JP | 11059364 A * | 3/1999 | ............ B60T 8/1755 |
| JP | 5252118 B2 | 7/2013 | |

OTHER PUBLICATIONS

Translation of JP 11-059364 A, published by Dialog. (Year: 1999).*

* cited by examiner

*Primary Examiner* — Thomas J Williams
(74) *Attorney, Agent, or Firm* — Sughrue Mion, PLLC

(57) ABSTRACT

Disclosed is a brake control apparatus which starts ABS control on the basis of slip ratio speed and which reduces a variation in the slip ratio at the time of start of the ABS control. A brake ECU computes a braking stiffness BS in a linearly increasing region of a μ-S characteristic, and computes a slip ratio speed reference value dSref/dt by dividing a changing speed dFxc/dt of braking force of a wheel by the braking stiffness BS. The brake ECU computes, as a slip ratio speed threshold, a value ((dSref/dt)+ dSn) by adding a slip ratio speed noise offset value dSn to the slip ratio speed reference value dSref/dt and starts ABS control when the slip ratio speed dSc**/dt of the wheel exceeds the slip ratio speed threshold.

6 Claims, 7 Drawing Sheets

BRAKE CONTROL APPARATUS FOR VEHICLE

BACKGROUND OF THE INVENTION

1. Field of the Invention

The present invention relates to a brake control apparatus for a vehicle (hereinafter may be referred to as a "vehicular brake control apparatus") which performs ABS control for preventing locking of wheels during braking.

2. Description of the Related Art

Conventionally, there has been known an ABS (antilock brake system) which prevents locking of wheels during braking, thereby preventing slippage of the wheels on a road surface. Braking force control performed by the ABS is called "ABS control." The ABS control is performed by a brake control apparatus (hereinafter referred to as a "brake ECU"). In general, the brake ECU detects the slip ratio of each wheel and starts the ABS control when the slip ratio exceeds an ABS start threshold. When the ABS control is started, the oil pressure of a wheel cylinder provided in a brake caliper of the wheel is controlled such that the slip ratio of the wheel is maintained at a target slip ratio. The target slip ratio is, for example, a slip ratio at which the coefficient of friction μ presumably becomes the maximum (hereinafter referred to as a "μ peak slip ratio").

For example, the apparatus proposed in Japanese Patent No. 5252118 employs not only slip ratio but also slip ratio speed (rate at which slip ratio changes; i.e., the amount of change in slip ratio per unit time) as the ABS start threshold for determining a timing at which the ABS control is started.

The proposed apparatus starts the ABS control when the slip ratio speed exceeds a slip ratio speed threshold set beforehand.

FIG. 4 is a graph (μ-S characteristic diagram) representing the relation between the slip ratio S of a wheel and the friction coefficient μ representing the degree of friction generated between a tire and a road surface. As shown in the μ-S characteristic diagram, at the beginning of braking, the friction coefficient μ increases approximately proportional to an increase in the slip ratio S. A region in which the friction coefficient μ increases approximately proportional to the slip ratio S will be referred to as a "linearly increasing region."

When the slip ratio S further increases and exceeds the upper limit of the linearly increasing region, the relation between the slip ratio S and the friction coefficient μ becomes non-linear. This region will be referred to as a "non-linear region." When the slip ratio S increases within the non-linear region, the friction coefficient μ becomes the maximum midway. A slip ratio at which the friction coefficient μ has the maximum value will be referred to as a "μ peak slip ratio Speak." In the non-linear region, a region on the left side of the μ peak slip ratio Speak is a non-linearly increasing region, and a region on the right side of the μ peak slip ratio Speak is a non-linearly decreasing region.

When the slip ratio exceeds a value corresponding to the boundary between the linearly increasing region and the non-linear region, its increasing speed (hereinafter referred to as "slip ratio speed") increases sharply.

In view of this, conceivably, when the slip ratio is obtained immediately after the slip ratio speed has exceeded the slip ratio speed threshold, the μ peak slip ratio can be estimated on the basis of the slip ratio. For example, when a value obtained by adding a predetermined value to the slip ratio obtained immediately after the slip ratio speed has exceeded the slip ratio speed threshold is used as a target slip ratio, a target slip ratio close to the μ peak slip ratio can be set.

Although the apparatus proposed in Japanese Patent No. 5252118 starts the ABS control when the slip ratio speed exceeds the slip ratio speed threshold, the ABS control is not started at an appropriate timing because the slip ratio speed threshold is fixed to a certain value.

For example, in the case where a driver quickly operates the brake pedal of a vehicle, braking force changes at high speed corresponding to the brake pedal operation speed, and slip ratio speed also changes with the speed at which the braking force changes. Therefore, the apparatus proposed in Japanese Patent No. 5252118 has a problem in that the slip ratio at the time of start of the ABS control varies. Consequently, the proposed apparatus may fail to set the target slip ratio to an appropriate value (value close to the μ peak slip ratio) and fail to perform the ABS control satisfactorily.

SUMMARY OF THE INVENTION

The present invention has been accomplished so as to solve the above-described problem, and one object of the present invention is to provide a brake control apparatus which starts ABS control on the basis of slip ratio speed and which reduces a variation in the slip ratio at the time of start of the ABS control.

According to a first aspect of the present invention, there is provided an improved vehicular brake control apparatus which achieves the above-described object. The vehicular brake control apparatus comprises:

slip detection means (10, 40) for detecting slip ratio of a wheel and slip ratio speed which is the rate at which the slip ratio changes; and ABS control means (10), operable when the slip ratio speed exceeds a slip ratio speed threshold, for starting ABS control which adjusts braking force of the wheel such that the slip ratio of the wheel follows a target slip ratio, the brake control apparatus being characterized by further comprising slip ratio speed threshold computation means (S20, S14) for computing the slip ratio speed threshold ((dSreff\*\*/dt)+dSn) on the basis of a changing speed (dFxc\*\*/dt) of the braking force of the wheel at the present point in time and a braking stiffness (BS\*\*) representing the relation between the slip ratio of the wheel and the braking force of the wheel in a state in which the ABS control has not yet been started and the slip ratio of the wheel falls within a predetermined low slip ratio range.

In the vehicular brake control apparatus of the present invention, the slip detection means detects the slip ratio of a wheel and the slip ratio speed which is the rate at which the slip ratio changes. When the slip ratio speed exceeds the slip ratio speed threshold, the ABS control means starts ABS control which adjusts the braking force of the wheel (braking force applied to the wheel) such that the slip ratio of the wheel follows the target slip ratio.

The vehicular brake control apparatus comprises the slip ratio speed threshold computation means as a means for starting the ABS control at an appropriate timing.

The slip ratio speed threshold computation means computes the slip ratio speed threshold on the basis of the changing speed of the braking force of the wheel at the present point in time and the braking stiffness representing the relation between the slip ratio of the wheel and the braking force of the wheel in a state in which the ABS control has not yet been started and the slip ratio of the wheel falls within the predetermined low slip ratio range. The low slip ratio range may be a range within which the slip ratio of the wheel and the braking force of the wheel are considered to have a linear relation therebetween. For example, the slip ratio of the wheel can be estimated on the basis of the speed of the wheel and the speed of the vehicle body. The braking force of the wheel is the braking force applied to the wheel. For example, in the case where the brake of the vehicle is a hydraulic brake, the oil pressure of a wheel cylinder provided for the wheel is detected, and the braking force of the wheel can be estimated from the detected oil pressure.

Accordingly, the vehicular brake control apparatus according to the first aspect of the present invention can reduce a variation in the slip ratio at the time of start of the ABS control. Namely, it is possible to prevent the slip ratio at the time of start of the ABS control from varying with the speed with which a driver operates the brake pedal of the vehicle. Thus, the ABS control can be performed satisfactorily.

According to a second aspect of the present invention, the vehicular brake control apparatus further comprises target slip ratio setting means (S24) for obtaining the slip ratio at the time when the slip ratio speed has exceeded the slip ratio speed threshold and setting the target slip ratio on the basis of the obtained slip ratio.

In the vehicular brake control apparatus according to the second aspect of the present invention, the target slip ratio setting means obtains the slip ratio at the time when the slip ratio speed has exceeded the slip ratio speed threshold and sets the target slip ratio on the basis of the obtained slip ratio. For example, it is preferred that the target slip ratio setting means use, as the target slip ratio, a value obtained by adding a predetermined value set beforehand to the obtained slip ratio. According to the second aspect of the present invention, the target slip ratio can be set more appropriately, and the ABS control can be performed more satisfactorily.

According to a third aspect of the present invention, the vehicular brake control apparatus further comprises braking stiffness computation means for computing the braking stiffness.

In this case, it is preferred that the braking stiffness computation means be configured to obtain the slip ratio of the wheel and the braking force of the wheel (S16) at a timing (S12: Yes) when the slip ratio (Sc) of the wheel has exceeded a previously set low slip ratio (SL) and determine the braking stiffness on the basis of a value obtained by dividing the braking force of the wheel by the slip ratio of the wheel (S18).

According to the third aspect of the present invention, an appropriate braking stiffness can be computed. For example, the braking stiffness is preferably a value obtained by dividing the braking force of the wheel by the slip ratio of the wheel.

According to a fourth aspect of the present invention, the slip ratio speed threshold computation means is configured to determine the slip ratio speed threshold (S20, S14) on the basis of a value ((dFxc/dt)/BS) obtained by dividing the changing speed of the braking force of the wheel by the braking stiffness.

According to the fourth aspect of the present invention, an appropriate slip ratio speed threshold can be computed.

According to a fifth aspect of the present invention, the vehicular brake control apparatus further comprises braking stiffness correction means (S21, S22) for correcting the braking stiffness computed by the braking stiffness computation means, wherein, after the braking stiffness is corrected by the braking stiffness correction means, the slip ratio speed threshold computation means computes the slip ratio speed threshold on the basis of the corrected braking stiffness and the changing speed of the braking force of the wheel at the present point in time.

The load of the vehicle shifts when braking forces are applied to the wheels. Namely, the load of each front wheel increases, and the load of each rear wheel decreases. Therefore, in some cases, the load of the vehicle may shift after the braking stiffness has been computed by the braking stiffness computation means. Also, the braking stiffness changes with the load of the wheel.

In view of the above, according to the fifth aspect of the present invention, the braking stiffness correction means is provided. The braking stiffness correction means corrects the braking stiffness computed by the braking stiffness computation means. Accordingly, the braking stiffness after the load shift can be obtained. After the braking stiffness is corrected by the braking stiffness correction means, the slip ratio speed threshold computation means computes the slip ratio speed threshold on the basis of the corrected braking stiffness and the changing speed of the braking force of the wheel at the present point in time. Accordingly, a more appropriate slip ratio speed threshold can be computed.

According to a sixth aspect of the present invention, the braking stiffness correction means is configured such that, after the braking stiffness is computed by the braking stiffness computation means, for a front wheel, the braking stiffness correction means newly obtains the braking force and the slip ratio, and computes the braking stiffness on the basis of the braking force and the slip ratio newly obtained so that the braking stiffness is corrected by a certain correction amount (S21), and for a rear wheel, the braking stiffness correction means corrects the braking stiffness computed by the braking stiffness computation means, on the basis of the correction amount (BSadjF*) of the braking stiffness of the front wheel (S22).

When braking forces are applied to the wheels, the load of each front wheel increases, and the load of each rear wheel decreases. When the load increases, the braking stiffness also increases. In the case where the braking stiffness has increased, conceivably, the slip ratio of each wheel falls within the linear region (has not entered the non-linear region). In such a case, the braking stiffness can be computed on the basis of the braking force and the slip ratio.

Meanwhile, when the load decreases, the braking stiffness also decreases. In this case, even when the braking stiffness is computed on the basis of the braking force and the slip ratio, it is impossible to determine whether the braking stiffness has decreased due to a decrease in the load or because the slip ratio has entered the non-linear region. Therefore, as to the braking stiffness of the rear wheel, a correct value cannot be obtained by the above-described computation.

In view of the foregoing, after the braking stiffness is computed by the braking stiffness computation means, for the front wheel, the braking stiffness correction means newly obtains the braking force and the slip ratio, and computes the braking stiffness on the basis of the braking force and the slip ratio newly obtained. The computed braking stiffness is used as the corrected braking stiffness of the front wheel.

For the rear wheel, the braking stiffness correction means corrects the braking stiffness computed by the braking stiffness computation means, on the basis of the correction amount of the braking stiffness of the front wheel. For example, the braking stiffness correction means corrects the braking stiffness of the rear wheel such that the braking stiffness of the rear wheel is decreased by the amount by which the braking stiffness of the front wheel has been increased. Accordingly, an appropriate braking stiffness can be computed even at the time of harsh braking which causes a large load shift. As a result, a more appropriate slip ratio speed threshold can be computed.

In the above description, in order to facilitate understanding of the present invention, the constituent elements of the invention corresponding to those of an embodiment of the invention which will be described later are accompanied by parenthesized names and/or symbols which are used in the embodiment; however, the constituent elements of the invention are not limited to those in the embodiment defined by the names and/or the symbols.

DESCRIPTION OF THE PREFERRED EMBODIMENT

A vehicular brake control apparatus according to an embodiment of the present invention will now be described with reference to the drawings.

Figure 1:
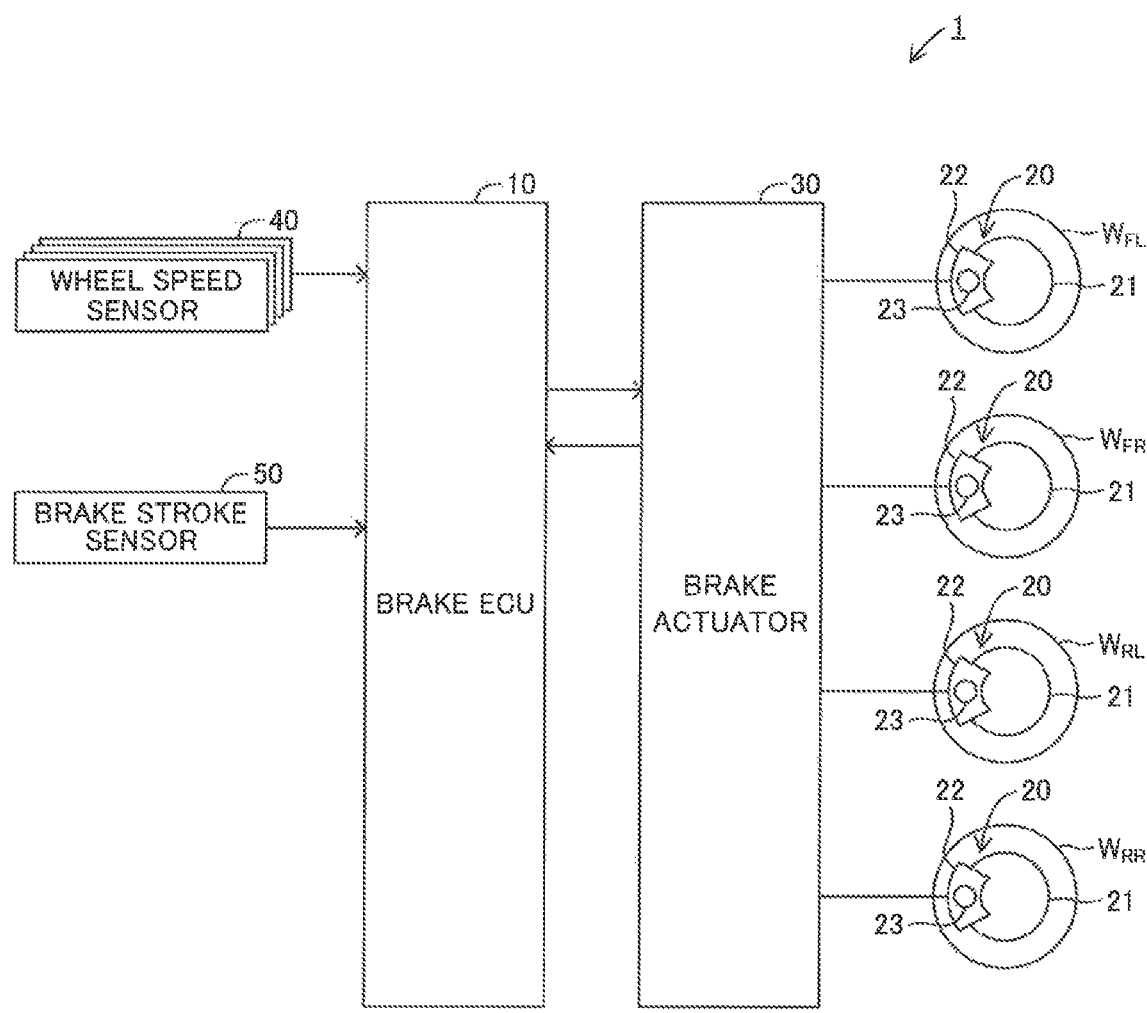
FIG. 1 is a schematic diagram of a vehicular brake control apparatus according to an embodiment of the present invention.

FIG. 1 schematically shows the configuration of a brake control apparatus 1 according to an embodiment of the present invention which is applied to a vehicle. The brake control apparatus 1 includes a brake ECU 10, a hydraulic friction brake mechanism 20, a brake actuator 30, wheel speed sensors 40, and a brake stroke sensor 50. The brake ECU 10 is connected to other ECUs (for example, an engine ECU, etc.) through an unillustrated CAN (controller area network) in such a manner that the brake ECU 10 can send information to the other ECUs and can receive information from the other ECUs. Notably, ECU stands for an electric control unit which includes a microcomputer as a main component. In the present specification, the microcomputer includes a CPU, a ROM, a RAM, a non-volatile memory, an interface I/F, etc. The CPU realizes various functions by executing instructions (programs, routines) stored in the ROM.

The hydraulic friction brake mechanism 20 is provided for each of a front left wheel WFL, a front right wheel WFR, a rear left wheel WRL, and a rear right wheel WRR. In the case where it is unnecessary to distinguish the front left wheel WFL, the front right wheel WFR, the rear left wheel WRL, and the rear right wheel WRR from one another, they are collectively referred to as the "front and rear, left and right wheels W" or simply as the "wheel W." Also, the front left wheel WFL and the front right wheel WFR are collectively referred to as the "front wheel WF*" and the rear left wheel WRL and the rear right wheel WRR are collectively referred to as the "rear wheel WR*."

The hydraulic friction brake mechanism 20 includes a brake disc 21 fixed to each wheel W and a brake caliper 22 fixed to a vehicle body. A wheel cylinder 23 provided in the brake caliper 22 is operated by the oil pressure of hydraulic oil supplied from the brake actuator 30, whereby brake pads are pressed against the brake disc 21 for generation of frictional braking force.

The brake actuator 30 is a known actuator which individually adjusts the oil pressures supplied to the individual wheel cylinders 23 provided for the wheels W. The brake actuator 30 includes a leg-power hydraulic circuit as well as a control hydraulic circuit. The leg-power hydraulic circuit supplies oil pressure to each wheel cylinder 23 from a master cylinder which pressurizes hydraulic oil in accordance with leg-power (depressing force) applied to a brake pedal. The control hydraulic circuit independently supplies control oil pressure to each wheel cylinder 23 without use of the depressing force applied to the brake pedal. The control hydraulic circuit includes a power oil pressure generation apparatus including a pressuring pump and an accumulator and generating high oil pressure, and a group of control valves for adjusting the oil pressure output from the power oil pressure generation apparatus and supplying the adjusted oil pressure to each wheel cylinder 23. The group of control valves includes a linear control valve for adjusting the oil pressure output from the power oil pressure generation apparatus to a target oil pressure, ABS holding valves each of which is a normally open electromagnetic valve and which are closed in a holding mode in the ABS control, ABS pressure reducing valves each of which is a normally closed electromagnetic valve and which are opened in a pressure reducing mode in the ABS control so as to establish communication between the wheel cylinders 23 and a reservoir, thereby reducing the oil pressures of the wheel cylinders 23, etc. The ABS holding valves and the ABS pressure reducing valves, which are located downstream of the linear control valve, are respectively provided in individual hydraulic circuits connected to the wheel cylinders 23. Notably, variously types of brake actuators are known and any of the known brake actuators may be employed as the brake actuator 30.

The brake actuator 30 includes oil pressure sensors for detecting the oil pressures of the wheel cylinders 23, the oil pressure of the master cylinder, and the oil pressure output from the power oil pressure generation apparatus, respectively, and detection signals output from the oil pressure sensors are transmitted to the brake ECU 10.

The wheel speed sensors 40 are provided for the front and rear, left and right wheels W, respectively, and transmit signals representing the rotational speeds of the wheels W (wheel speeds) to the brake ECU 10. The brake ECU 10 computes the speed of the vehicle body (the travel speed of the vehicle) from the wheel speeds of the four wheels. Any of various known methods of computing the vehicle body speed may be employed. A piece of information representing the computed vehicle body speed is transmitted to various ECUs through the unillustrated CAN. As will be described later, the brake ECU 10 computes slip ratios of the wheels W from the wheel speeds and the vehicle body speed.

The brake stroke sensor 50 detects a pedal stroke, which is the amount by which the brake pedal is depressed (operated), and transmits a signal representing the detected brake pedal stroke to the brake ECU 10.

The brake ECU 10 determines a demanded braking force (braking force demanded by the driver) on the basis of the brake pedal stroke and controls the brake actuator 30 such that the demanded braking force is generated by the hydraulic friction brake mechanism 20.

<Outline of ABS Control>

Next, the ABS control performed by the brake ECU 10 will be described. The ABS control is individually performed for each of the wheels W. The ABS control is started upon detection of the possibility of locking of the wheels W due to operation of the hydraulic friction brake mechanism 20, and adjusts braking forces applied to the wheels W, independently of driver's brake pedal operation, such that the slip ratio of each wheel W is maintained in a range close to the target slip ratio. For adjustment of the braking forces, the oil pressures of the wheel cylinders 23 are adjusted by, for example, opening and closing the ABS holding valves and the ABS pressure reducing valves provided in the brake actuator 30.

For such ABS control, a conventionally known ABS control method may be employed. It is important for the ABS control to set the target slip ratio to a value close to a μ peak slip ratio. The μ peak slip ratio is a slip ratio at which the largest friction coefficient μ is obtained. The μ peak slip ratio changes depending of road surface condition, etc. Accordingly, accurate estimation of the μ peak slip ratio is important.

Figure 4:
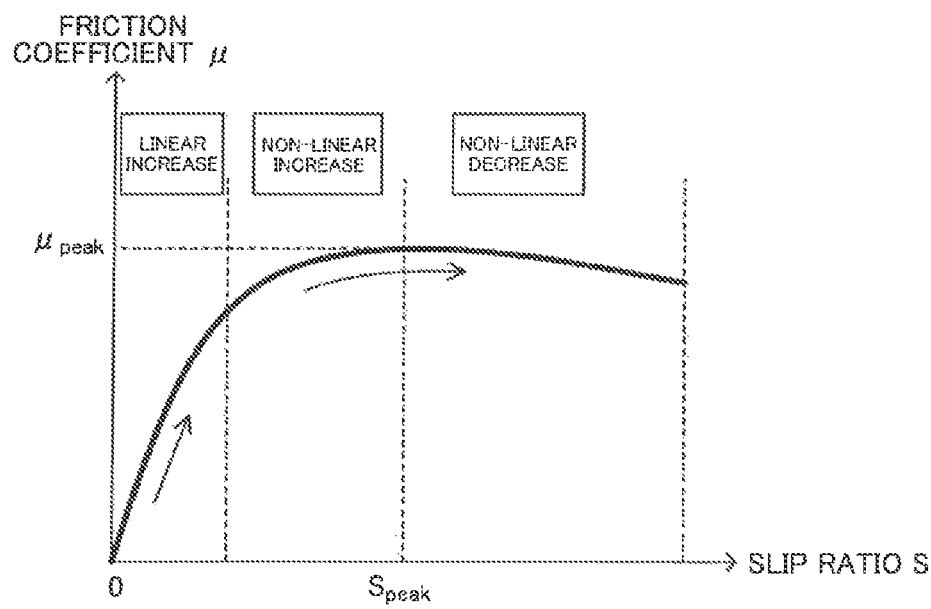
FIG. 4 is a graph showing the relation between slip ratio (horizontal axis) and friction coefficient (vertical axis)

As shown in the μ-S characteristic diagram of FIG. 4, at the beginning of braking, the friction coefficient μ increases approximately proportional to an increase in the slip ratio S. The region in which the friction coefficient μ increases approximately proportional to the slip ratio S is the linearly increasing region. In the case where the braking force is greater than frictional force, the friction coefficient μ increases until the difference between the braking force and the frictional force becomes zero.

In the case where the slip ratio S further increases beyond the upper limit of the linearly increasing region, the relation between the slip ratio S and the friction coefficient μ becomes non-linear. When the slip ratio exceeds a value corresponding to the boundary (point) between the linearly increasing region and the non-linearly increasing region, its increasing speed (slip ratio speed) increases sharply. A μ peak at which the friction coefficient μ becomes the maximum appears at a point which the slip ratio reaches as a result of further increasing from the value corresponding to the point where the slip ratio speed increases sharply (a μ peak slip ratio Speak is present). Accordingly, by finding out the point where the slip ratio speed increases sharply, the μ peak slip ratio Speak can be estimated by using that point as a reference.

Figure 5:
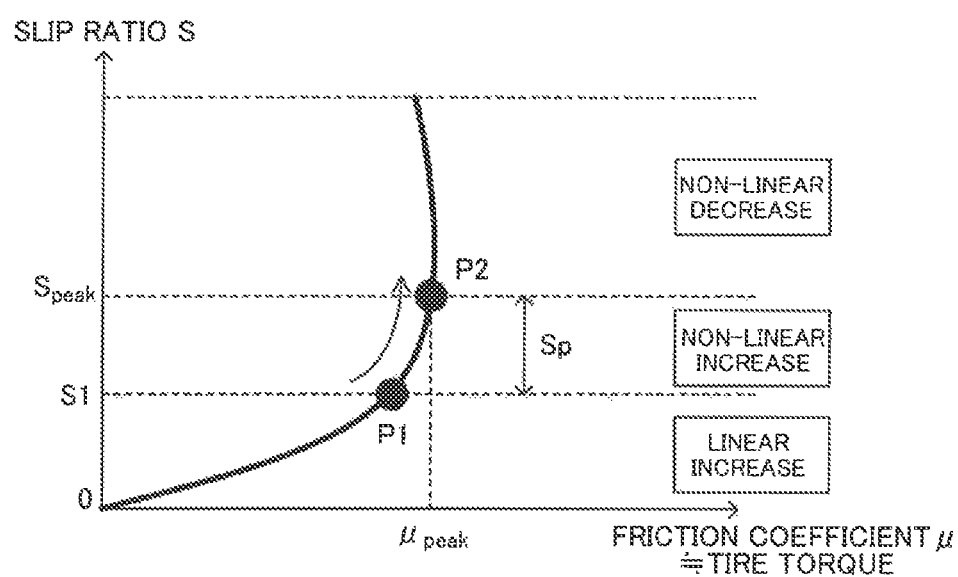
FIG. 5 is a graph showing the relation between friction coefficient (horizontal axis) and slip ratio (vertical axis)

FIG. 5 is a characteristic diagram in which the horizontal axis represents the friction coefficient μ and the vertical axis represents the slip ratio S. It is considered that the horizontal axis represents tire torque. When the braking force of a wheel increases as a result of brake operation, its slip ratio S increases accordingly. At a point P1, the slip ratio S increases sharply. It is possible to presume that the μ peak slip ratio Speak is present at a point P2 at which the slip ratio S has a value which is greater than that at the point P1 (reference point) by a predetermined value Sp. Accordingly, the μ peak slip ratio Speak can be estimated by finding the point P1 where the slip ratio S increases sharply.

In view of the above, the brake ECU 10 detects the slip ratio speed at all times. The slip ratio speed is the rate at which the slip ratio changes; i.e., the amount of change in the slip ratio per unit time. The brake ECU 10 detects a timing at which the slip ratio speed has exceeded a threshold (slip ratio speed threshold) set beforehand. This timing corresponds to a timing at which the point P1 in FIG. 5 has been detected. At the timing at which the point P1 has been detected, the brake ECU 10 stores a value (S1+Sp) which is obtained by adding the predetermined value Sp to the slip ratio S1 at the point P1 and is to be used as a target slip ratio Starget. The brake ECU 10 then starts the ABS control. The predetermined value Sp is set through an experiment or the like such that the target slip ratio Starget has a value close to the μ peak slip ratio Speak.

The slip ratio speed changes with the speed with which the driver operates the brake pedal. For example, when the driver quickly operates the brake pedal, the braking force changes at high speed corresponding to the brake pedal operation speed, and the slip ratio speed also changes with the speed at which the braking force changes. Therefore, if a fixed slip ratio speed threshold is employed, the timing at which the slip ratio speed exceeds the slip ratio speed threshold varies. Namely, the slip ratio immediately after the slip ratio speed has exceeded the slip ratio speed threshold varies with the speed with which the driver operates the brake pedal. Therefore, there is a possibility that the target slip ratio is not set property.

In view of the foregoing, in the present embodiment, the slip ratio speed threshold is computed through use of a braking stiffness BS representing the relation between the slip ratio of the wheel and the braking force of the wheel in the linearly increasing region, and the timing of starting the ABS control is determined through use of the computed slip ratio speed threshold. The ABS control is started at a timing when the detected slip ratio speed has exceeded the slip ratio speed threshold.

Figure 6:
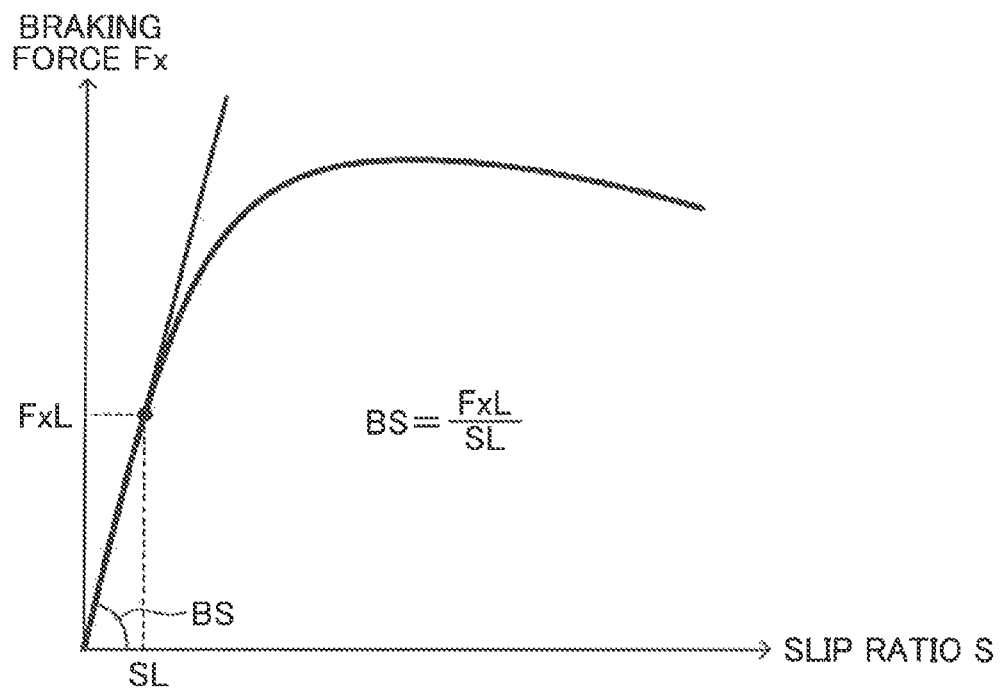
FIG. 6 is a graph showing the relation between slip ratio (horizontal axis) and braking force (vertical axis)

FIG. 6 is a characteristic diagram showing the relation between the slip ratio of the wheel and the braking force (tire force) of the wheel. The braking stiffness BS represents the ratio of the braking force to the slip ratio, i.e., the inclination of a characteristic curve representing the relation between the slip ratio and the braking force in FIG. 6, in the linearly increasing region (low slip ratio range) in which the slip ratio and the braking force can be considered to have a linear relation therebetween. For example, in the case where the characteristic curve passes through a certain point (SL, FxL) in the linearly increasing region, the braking stiffness BS can be computed in accordance with the following Equation (1).

$$BS = FxL/SL \quad (1)$$

Equation (1) shows that the slip ratio S can be represented by using the braking force Fx and the braking stiffness BS as shown in the following Equation (2).

$$S = Fx/BS \quad (2)$$

In the low slip ratio range, the slip ratio S and the braking force Fx can be considered to have a linear relation therebetween. Therefore, one-to-one correspondence is present between braking force speed dFx/dt, which is the changing speed of the braking force Fx, and the slip ratio speed dS/dt. Accordingly, if the braking force speed dFx/dt is found, the slip ratio at the time of start of the ABS control is prevented from varying by setting a slip ratio speed threshold corresponding to the braking force speed dFx/dt.

In the present embodiment, as shown in the following Equation (3), a slip ratio speed reference value dSref/dt is computed by dividing the braking force speed dFx/dt by the braking stiffness BS.

$$dSref/dt=(dFx/dt)/BS \qquad (3)$$

Then, on the basis of the slip ratio speed reference value dSref/dt, the slip ratio speed threshold which determines the timing of starting the ABS control is set.

Preferably, the ABS control is started at a timing at which the slip ratio speed increases sharply from the slip ratio speed reference value dSref/dt. In order to start the ABS control at such a timing, the slip ratio speed threshold is set to a value (dSref/dt+dSn) obtained by adding a predetermined value dSn to the slip ratio speed reference value dSref/dt. In the following description, the predetermined value dSn will be referred to as a "slip ratio speed noise offset dSn."

At a timing at which the slip ratio speed has exceeded the slip ratio speed threshold, the target slip ratio is computed, and simultaneously with this, the ABS control is started. The target slip ratio is set to a value obtained by adding a previously set value Sp (hereinafter called "µ peak slip ratio offset) to the slip ratio S at the time when the ABS control is started (when the slip ratio speed has exceeded the slip ratio speed threshold).

As described above, the slip ratio speed threshold is set in consideration of the braking stiffness BS and the braking force speed dFx/dt. Therefore, it is possible to prevent the slip ratio at the time of start of the ABS control from varying with the speed with which the driver operates the brake pedal. As a result, it is possible to set the target slip ratio to a value close to the µ peak slip ratio Speak.

The braking stiffness BS is computed at the beginning of braking. Meanwhile, the ABS control is started at a timing when a state in which the slip ratio speed has exceeded the slip ratio speed threshold is actually detected after the braking stiffness BS has been computed. Therefore, in the case where the load of the vehicle shifts due to braking force in a period between the point in time when the braking stiffness BS is computed and the point in time when the ABS control is started, the braking stiffness BS may change in that period.

Figure 7:
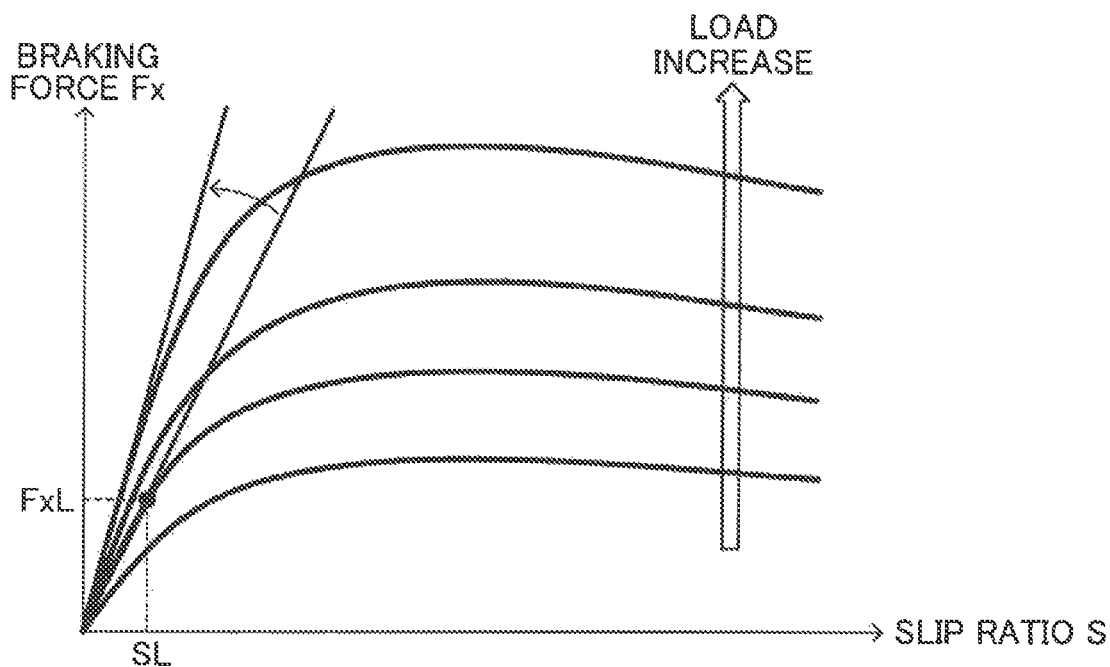
FIG. 7 is a graph showing the relation between slip ratio (horizontal axis) and braking force (vertical axis), which relation changes with load.

At the time of braking, the load of the vehicle shifts forward. Therefore, the load of the front wheel WF* increases, and the load of the rear wheel WR* decreases. FIG. 7 shows the relation between the slip ratio S of a wheel and the braking force Fx of the wheel in the case where a load change occurs. As shown in FIG. 7, the braking stiffness BS increases as the load increases.

It is preferred that the timing at which the ABS control is started be determined by a slip ratio speed threshold computed through use of the braking stiffness BS as latest as possible. In view of this, in the present embodiment, a correction process is performed so as to correct the braking stiffness BS computed at the beginning of braking. A conceivable method of correcting the braking stiffness BS is to again detect the braking force and the slip ratio at the present point in time and compute the latest braking stiffness BS in accordance with the above-described Equation (1); i.e., by dividing the detected braking force by the detected slip ratio. In the case of the front wheel WF*, if the braking stiffness BS has increased, conceivably, the slip ratio of each wheel is within the linear region (does not enter the non-linear region). Therefore, the braking stiffness BS re-computed in accordance with the above-described Equation (1) can be employed as a correct value.

Meanwhile, in the case of the rear wheel WR*, when the braking stiffness BS has been decreased, it is impossible to determine whether the braking stiffness BS has been decreased due to a decrease in the load or because the slip ratio has entered the non-linear region. In the case where the slip ratio has entered the non-linear region, the braking stiffness BS re-computed in accordance with the above-described Equation (1) cannot be employed as a correct value.

In view of the above, for the rear wheel WR*, the amount by which the braking stiffness BS of the front wheel WF* has increased is used as a correction value. Namely, the braking stiffness BS of the rear wheel WR* is set to a value obtained by subtracting, from the braking stiffness BS computed at the beginning, the amount by which the braking stiffness BS of the front wheel WF* has increased.

As a result, in all the front and rear, left and right wheels W, the braking stiffness BS can be corrected to a proper value in consideration of a change in load.

In the present embodiment, even after the ABS control has been started, the target slip ratio is cleared and newly computed during the ABS control when a predetermined condition is satisfied.

<Target Slip Ratio Setting Routine>

Figure 2:
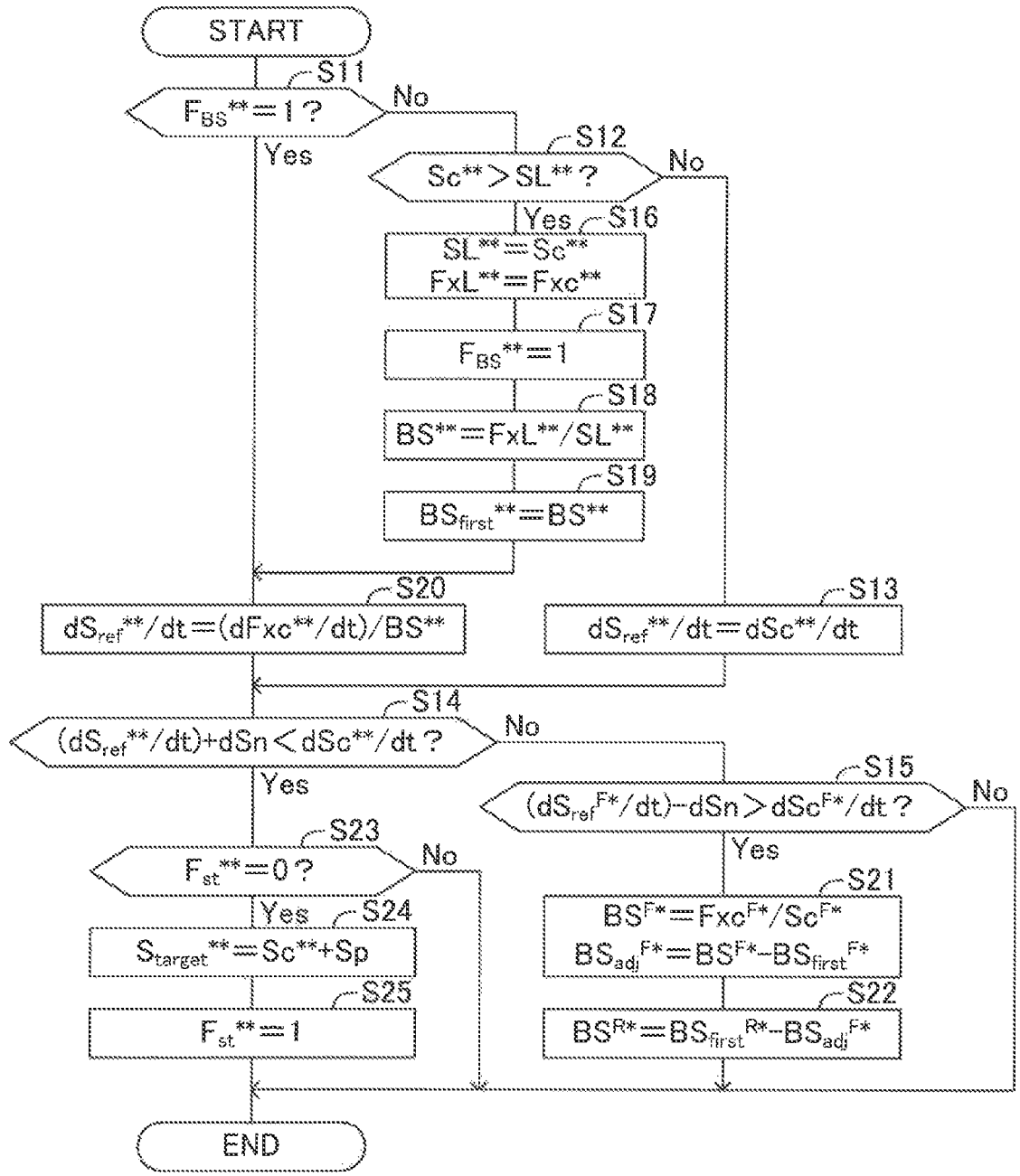
FIG. 2 is a flowchart representing a target slip ratio setting routine.

Next, a specific process performed by the brake ECU 10 will be described. FIG. 2 shows a target slip ratio setting routine performed by the brake ECU. A characteristic process performed by the brake ECU 10 in the present embodiment is a process of setting the target slip ratio used in the ABS control (which can be considered as a process of setting a timing when the ABS control is started). As to control of the oil pressures of the wheel cylinders 23 during the ABS control, any of conventionally known various method can be used. Therefore, the method of controlling the oil pressures of the wheel cylinders 23 during the ABS control will not described here.

The brake ECU 10 repeatedly performs the target slip ratio setting routine at predetermined short computation intervals. Separately from the target slip ratio setting routine, the brake ECU 10 performs, at predetermined short computation intervals, a routine for individually computing the slip ratios of the front and rear, left and right wheels W. The slip ratio of each wheel can be computed by an expression of ((vehicle body speed−wheel speed)/vehicle body speed).

When the target slip ratio setting routine is started, the brake ECU determines in step S11 whether or not the value of a BS data detected flag FBS is "1." The BS data detected flag FBS is a flag signal representing whether or not low slip ratio SL and braking force at low slip ratio FxL, which are data for computing the braking stiffness BS, have been detected. When the value of the BS data detected flag FBS is "1," it represents that the low slip ratio SL and the braking force at low slip ratio FxL have already been detected. When the value of the BS data detected flag FBS is "0," it represents that the low slip ratio SL and the braking force at low slip ratio FxL have not yet been detected. In the following description, the low slip ratio SL and the braking force at low slip ratio FxL may be referred to as "BS computation data." When the target slip ratio setting routine is started, the value of the BS data detected flag FBS** is "0."

In the target slip ratio setting routine, for the front and rear, left and right wheels W, respective control parameters, etc. are computed. Therefore, an index "" attached to the end of a symbol representing a certain value means that that value is individually set for each of the front and rear, left and right wheels W. For example, in step S11, the determination as to whether or not the value of the BS data detected flag FBS is "1" is individually made for each of the front and rear, left and right wheels W. Also, in the case where a symbol represents a value which is individually set for each of the left and right front wheels WF*, an index "F*" is attached to the end of that symbol, and in the case where a symbol represents a value which is individually set for each of the left and right rear wheels WR*, an index "R*" is attached to the end of that symbol.

The low slip ratio SL is the value of the slip ratio detected in step S16 which will be described later. The braking stiffness BS of a wheel is a value representing the relation between the slip ratio of the wheel and the braking force of the wheel. In the low slip ratio range, the slip ratio and the braking force have a linear relation (relation of direct proportion) therebetween. Accordingly, the low slip ratio SL is set to an arbitrary value of slip ratio (>0) in the low slip ratio range in which the slip ratio and the braking force have a linear relation therebetween.

The braking force at low slip ratio FxL is the braking force of the wheel when the low slip ratio SL is detected. In the present embodiment, the brake ECU 10 estimates the magnitude of the braking force from the oil pressure of the wheel cylinder 23. Accordingly, the braking force at low slip ratio FxL is a value estimated from the oil pressure (the value detected by the corresponding oil pressure sensor) of the wheel cylinder 23 at the time when the low slip ratio SL is detected. For example, the brake ECU 10 has a stored map representing the relation between the oil pressure of the wheel cylinder 23 and the braking force of the wheel and determines the braking force of the wheel by referring to the map.

Immediately after the startup of the target slip ratio setting routine, the value of the BS data detected flag FBS is "0." Therefore, the brake ECU 10 proceeds to step S12 so as to determine whether or not the slip ratio Sc detected at the present point in time is greater than the low slip ratio SL. The low slip ratio SL** used in step S12 is a previously set value of slip ratio which is greater than zero and falls within the low slip ratio range (linearly increasing region).

Immediately after the startup of the target slip ratio setting routine, the wheels W have no slippage. Therefore, the brake ECU 10 makes a "No" determination in S12. In this case, the brake ECU 10 proceeds to step S13 so as to compute the changing speed of the slip ratio Sc (hereinafter referred to as the "slip ratio speed $dScdt$") at the present point in time and stores the value of the slip ratio speed $dSc/dt$ in a storage area for a slip ratio speed reference value $dSrefdt$ ($dSref/dt \leftarrow dSc/dt$). The slip ratio speed $dSc/dt$ is computed by the brake ECU 10 at short intervals. Therefore, in step S13, the latest value of the slip ratio speed $dSc/dt$ is stored in the storage area for the slip ratio speed reference value $dSref**/dt$.

Subsequently, in step S14, the brake ECU 10 adds the slip ratio speed noise offset value dSn to the slip ratio speed reference value $dSref/dt$ and determines whether or not the slip ratio speed $dSc/dt$ at the present point in time is lager than the value $((dSref/dt)+dSn)$ obtained through the addition of the slip ratio speed noise offset value dSn to the slip ratio speed reference value $dSref/dt$. As will be understood from a process which will be described later, the value $((dSref**/dt)+dSn)$ is a threshold (slip ratio speed threshold) for determining whether or not the ABS control is to be started. Accordingly, in step S14, a process of computing the slip ratio speed threshold is contained.

In this case, as a result of the processing of step S13, the slip ratio speed reference value $dSref/dt$ has been set to a value equal to the slip ratio speed $dSc/dt$ at the present point in time. Therefore, the brake ECU 10 makes a "No" determination in step S14. Subsequently, the brake ECU 10 proceeds to step S15 so as to subtract the slip ratio speed noise offset value dSn from the slip ratio speed reference value $dSrefF*/dt$ of the front wheel WF* and determines whether or not the slip ratio speed $dScF*/dt$ of the front wheel WF* at the present point in time is smaller than the value $((dSrefF*/dt)-dSn)$ obtained through the subtraction of the slip ratio speed noise offset value dSn from the slip ratio speed reference value $dSrefF*/dt$. The brake ECU 10 makes a "No" determination in this case as well and ends the current execution of the target slip ratio setting routine.

The brake ECU 10 repeats the target slip ratio setting routine at predetermined short computation intervals. Accordingly, the above-described processing is repeated during a period during which the slip ratio Sc is not larger than the low slip ratio SL. When the brake ECU 10 determines in step S12 that the slip ratio Sc is larger than the low slip ratio SL, the brake ECU 10 makes a "Yes" determination in step S12 and proceeds to step S16.

In step S16, the brake ECU 10 stores the value of the slip ratio Sc at the present point in time in a storage area for the low slip ratio SL (SL←Sc) and stores the value of the braking force Fxc at the present point in time in a storage area for the braking force at low slip ratio FxL (FxL←Fxc). In this manner, the BS computation data (SL, FxL) are obtained.

Subsequently in step S17, the brake ECU 10 sets the value of the BS data detected flag FBS to "1." As a result, the "fact that the low slip ratio SL and the braking force at low slip ratio FxL** have been detected" is memorized.

Notably, the slip ratio Sc was determined to be equal to or smaller than the low slip ratio SL until a point immediately before the instance at which the brake ECU 10 determines in step S12 that the slip ratio Sc at the present point in time is larger than the low slip ratio SL. Therefore, the slip ratio Sc at the present point in time can be considered to be slightly larger than the low slip ratio SL and fall within the low slip ratio range (the linearly increasing region). In other words, the low slip ratio SL is set to a value small enough to ensure that the slip ratio Sc at the time when the brake ECU 10 makes a "Yes" determination in step S12 always falls within the low slip ratio range.

After completion of the processing of step S17, the brake ECU 10 computes the braking stiffness BS in step S18. As shown in the following Equation (4), the braking stiffness BS is computed by dividing the braking force at low slip ratio FxL by the low slip ratio SL.

$$BS=FxL/SL** \qquad (4)$$

Subsequently, in step S19, the brake ECU 10 stores the computed value of the braking stiffness BS as a first braking stiffness BSfirst (BSfirst←BS). This first braking stiffness BSfirst** is used for a process of correcting the braking stiffness BS* which will be described later.

Subsequently, in step S20, the brake ECU 10 computes a slip ratio speed reference value $dSref**/dt$ as shown in the following Equation (5).

$$dSref/dt=(dFxc/dt)/BS** \qquad (5)$$

$dFxc/dt$ represents the changing speed of the braking force Fxc (i.e., the braking force speed) at the present point in time. For example, the brake ECU 10 stores the braking force Fxc in a predetermined latest period and computes the braking force speed $dFxc/dt$ on the basis of the amount of change in the braking force Fxc per unit time. In this manner, the slip ratio speed reference value dSref/dt is computed by dividing the braking force speed dFxc/dt at the present point in time by the braking stiffness BS computed as described above.

Although the slip ratio speed reference value dSref/dt is computed in step S13 immediately after the startup of the target slip ratio setting routine, it is changed by the computing processing of step S20. Accordingly, after the computing processing of step S20 is performed, the slip ratio speed reference value dSref/dt computed in accordance with Equation (5) is used for the determination processing in step S14 and the determination processing in step S15.

In step S14, the brake ECU 10 adds the slip ratio speed noise offset value dSn to the slip ratio speed reference value dSref/dt computed in step S20 and determines whether or not the slip ratio speed dSc/dt at the present point in time is larger than the value ((dSref/dt)+dSn) obtained as a result of the addition of the slip ratio speed noise offset value dSn to the slip ratio speed reference value dSref/dt. In the case where the slip ratio speed dSc/dt at the present point in time is equal to or smaller than the value ((dSref/dt)+dSn) (S14: No), the brake ECU 10 proceeds to step S15. In step S15, the brake ECU 10 subtracts the slip ratio speed noise offset value dSn from the slip ratio speed reference value dSreF*/dt of the front wheel WF* and determines whether or not the slip ratio speed dScF*/dt of the front wheel WF* at the present point in time is smaller than the value (dSrefF*/dt)−dSn) obtained as a result of the subtraction of the slip ratio speed noise offset value dSn from the slip ratio speed reference value dSreF*/dt.

In the case where the slip ratio speed dScF*/dt of the front wheel WF* at the present point in time is equal to or larger than the value (dSrefF*/dt)−dSn) (S15: No), the brake ECU 10 ends the current execution of the target slip ratio setting routine.

When a time corresponding to the predetermined short computation intervals has elapsed, the brake ECU 10 starts the target slip ratio setting routine again. In this case, since the value of the BS data detected flag FBS is "1," the brake ECU 10 proceeds directly to step S20. Accordingly, the brake ECU 10 skips the above-described step S12, S13, and S16 to S19 and proceeds to step S20 so as to compute the slip ratio speed reference value dSref/dt. The brake ECU 10 repeats the above-described determination processing of step S14 and the above-described determination processing of step S15 on the basis of the computed slip ratio speed reference value dSref**/dt.

During that period, the slip ratio speed reference value (dSref/dt) is repeatedly updated to the latest value corresponding to the braking force speed dFxc/dt at the present point in time (S20).

When such processing is repeated and the slip ratio speed dScF*/dt of the front wheel WF* becomes smaller than the value ((dSrefF*/dt)−dSn), the brake ECU 10 makes a "Yes" in step S15 and proceeds to step S21.

In step S21, the brake ECU 10 re-computes the braking stiffness BSF* of the front wheel WF. As shown in the following Equation (6), the braking stiffness BSF* of the front wheel WF* is computed by dividing the braking force FxcF* of the front wheel WF* at the present point in time by the slip ratio ScF* of the front wheel WF* at the present point in time.

$$BSF^* = FxcF^*/ScF^* \quad (6)$$

Accordingly, the newest braking stiffness BSF of the front wheel WF* is computed.

Subsequently, the brake ECU 10 computes the correction amount BSadjF of the braking stiffness BSF* of the front wheel WF*. As shown in the following Equation (7), the correction amount BSadjF* is obtained from the difference (BSF*−BSfirstF*) between the braking stiffness BSF* of the front wheel WF* computed this time and the first braking stiffness BSfirstF* of the front wheel WF* stored in step S19.

$$BSadjF^* = BSF^* - BSfirstF^* \quad (7)$$

Subsequently, in step S22, the brake ECU 10 re-computes the braking stiffness BSR* of the rear wheel WR*. As shown in the following Equation (8), the braking stiffness BSR* of the rear wheel WR* is set to a value obtained by subtracting the correction amount BSadjF* computed in step S21 from the first braking stiffness BSfirstR* of the rear wheel WR* stored in step S19.

$$BSR^* = BSfirstR^* - BSadjF^* \quad (8)$$

At the time of braking, the load of the vehicle shifts forward. Therefore, the load of the front wheel WF* increases, and the load of the rear wheel WR* decreases. As a result, the braking stiffness BSF* of the front wheel WF* increases. Accordingly, when the braking stiffness BSF* computed in accordance with Equation (6) is larger than the first braking stiffness BSfirstF*, conceivably, the slip ratio ScF* of the front wheel WF* falls within the linearly increasing region.

Meanwhile, in the case of the rear wheel WR*, the braking stiffness BSR* decreases with a decrease in the load. The braking stiffness BSR* also decreases when the slip ratio has entered the non-linear region. Therefore, if Equation (6) is applied to the rear wheel WR* and the braking stiffness BSR* is computed by dividing the braking force FxcR* of the rear wheel WR* at the present point in time by the slip ratio ScR* of the rear wheel WR* at the present point in time, it becomes impossible to determine whether the braking stiffness BSR* has decreased due to a decrease in the load or because the slip ratio ScR* has entered the non-linear region. The braking stiffness BS must represent the ratio of braking force to slip ratio in the linearly increasing region.

In view of the above, the brake ECU 10 computes the braking stiffness BSR* of the rear wheel WR* by using the increase amount of the braking stiffness BSF* of the front wheel WF* (the correction amount BSadjF*). Accordingly, the braking stiffness BSR* of the rear wheel WR* can be computed appropriately. The braking stiffness BS computed in steps S21 and S22 is used for the computation of the slip ratio speed reference value dSref/dt in the step S20 from the next time. Accordingly, the processing of steps S21 and S22 is processing of correcting the braking stiffness BS** computed for the first time.

Notably, in the case where the braking stiffness BSF* of the front wheel WF* computed in step S21 is smaller than the first braking stiffness BSfirstF*, the brake ECU 10 invalidates that processing. In such a case, the brake ECU 10 does not perform the processing of step S22. For example, it is preferred that the brake ECU 10 perform correction of the braking stiffness BS** of the front and rear wheels W only when the braking stiffness BSF* of the front wheel WF* is larger than the first braking stiffness BSfirstF* by a predetermined value or more.

After completion of the processing of step S22, the brake ECU 10 ends the current execution of the target slip ratio setting routine. When a period corresponding to the predetermined short computation intervals has elapsed, the brake ECU 10 starts the target slip ratio setting routine again. Accordingly, from the next time, the slip ratio speed reference value dSref/dt is computed in step S20 by using the corrected braking stiffness BS and the braking force speed dFxc**/dt at the present point in time.

When such processing is repeated and the slip ratio speed dSc**dt becomes larger than the value ((dSref*/dt)+dSn), the brake ECU 10 makes a "Yes" determination in step S14 and proceeds to step S23.

In step S23, the brake ECU 10 determines whether or not the value of a target slip ratio flag Fst is "0." The target slip ratio flag Fst is a flag signal representing whether or not the target slip ratio Starget has been set. When the value of the target slip ratio flag Fst is "1," the target slip ratio flag Fst represents that the target slip ratio Starget has been set, and when the value of the target slip ratio flag Fst is "0," the target slip ratio flag Fst represents that the target slip ratio Starget** has not yet been set.

At the time of startup of the target slip ratio setting routine, the value of the target slip ratio flag Fst is "0." Accordingly, the brake ECU 10 makes a "Yes" determination in step S23 and proceeds to step S24. In step S24, the brake ECU 10 computes the target slip ratio Starget. As shown in the following Equation (9), the target slip ratio Starget is computed by adding a µ peak slip ratio offset Sp to the slip ratio Sc at the present point in time.

$$Starget^{}=Sc^{}+Sp \quad (9)$$

After computation of the target slip ratio Starget, the brake ECU 10 starts the ABS control. When the ABS control is started, the operation of the brake actuator 30 is controlled such that the slip ratio Sc follows the target slip ratio Starget**.

After having computed the target slip ratio Starget and started the ABS control, in step S25, the brake ECU 10 sets the value of the target slip ratio flag Fst to "1." As a result, the fact that the target slip ratio Starget** has been set is memorized.

After completion of the processing of step S25, the brake ECU 10 ends the current execution of the target slip ratio setting routine. The brake ECU 10 repeats the target slip ratio setting routine at predetermined computation intervals. At this point in time, since the value of the target slip ratio flag Fst is "1," the result of the determination in step S23 becomes "No" and the target slip ratio Starget is not changed. Namely, at the timing when the slip ratio speed dSc/dt is first determined to have exceeded the value ((dSref/dt)+dSn) (S14: Yes), the target slip ratio Starget is computed and the ABS control is started, and after that point in time, the ABS control is continued by using the target slip ratio Starget. Accordingly, the value ((dSrefdt)+dSn) is a threshold for determining whether to start the ABS control: i.e., the slip ratio speed threshold. In the following description, the value (dSref/dt)+dSn) may be referred to as the "slip ratio speed threshold." Notably, after the ABS control is started, the braking stiffness BS** is not corrected.

The ABS control is continued until a previously set end condition is satisfied. An example of the end condition is that the possibility of locking of the wheel W has disappeared, for example, the driver-demanding braking force set in accordance with the driver's brake pedal operation has become equal to or smaller than the braking force generated by the brake actuator 30. Also, when the ABS control ends, the target slip ratio flag Fst and the BS data detected flag FBS are reset (their values are changed from "1" to "0").

<Flag Setting Routine>

Figure 3:
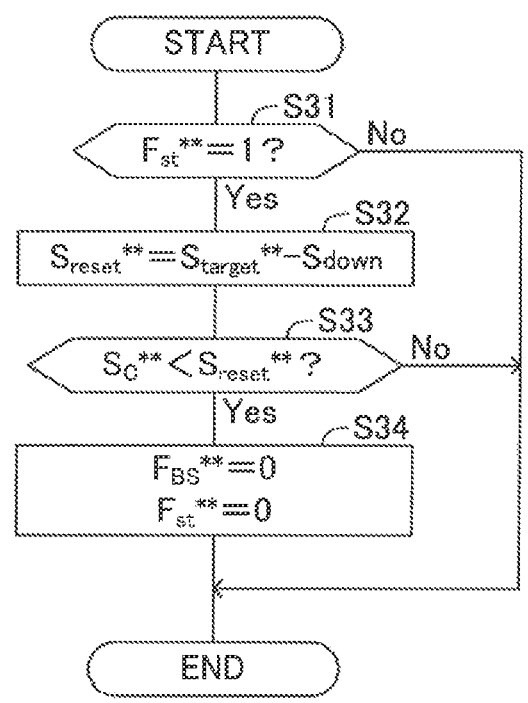
FIG. 3 is a flowchart representing a flag setting routine.

In parallel with the above-described target slip ratio setting routine (FIG. 2), the brake ECU 10 performs a flag setting routine shown in FIG. 3 at predetermined short computation intervals. In the target slip ratio setting routine, once the target slip ratio Starget is set, after that point in time, the ABS control is performed by continuously using the target slip ratio Starget. The flag setting routine is a process for resetting the above-described BS data detected flag FBS and the above-described target slip ratio flag Fst in the middle of the ABS control so that the target slip ratio Starget** is re-computed in the target slip ratio setting routine.

When the flag setting routine is started, in step S31, the brake ECU 10 determines whether or not the value of the target slip ratio flag Fst is "1." Namely, the brake ECU 10 determines whether or not the ABS control is currently performed. In the case where the value of the target slip ratio flag Fst is "0" (S31: No), the brake ECU 10 ends the current execution of the flag setting routine. In the case where the brake ECU 10 determines that the value of the target slip ratio flag Fst** is "1" during the repeated performance of such processing, the brake ECU 10 proceeds to step S32.

In step S32, the brake ECU 10 computes a reset determination threshold Sreset. As shown in the following Equation (10), the reset determination threshold Sreset is set to a value obtained by subtracting a previously set value Sdown from the target slip ratio Starget** at the present point in time.

$$Sreset^{}=Starget^{}-Sdown \quad (10)$$

Subsequently, in step S33, the brake ECU 10 determines whether or not the slip ratio Sc at the present point in time is smaller than the reset determination threshold Sreset. In the case where the slip ratio Sc is equal to or larger than the reset determination threshold Sreset (S33: No), the brake ECU 10 ends the current execution of the flag setting routine.

In the case where the brake ECU 10 determines that the slip ratio Sc has become smaller than the reset determination threshold Sreset during the repeated performance of such processing (S33: Yes), the brake ECU 10 proceeds to step S34.

In step S34, the brake ECU 10 resets the BS data detected flag FBS and the target slip ratio flag Fst. Namely, the brake ECU 10 sets the value of the BS data detected flag FBS and the value of the target slip ratio flag Fst are set to "0." After completion of the processing of step S34, the brake ECU 10 ends the current execution of the flag setting routine.

After the BS data detected flag FBS and the target slip ratio flag Fst have been reset, in the target slip ratio setting routine (FIG. 2), the result of the determination in step S11 becomes "No." Accordingly, the above-described processing starting from step S12 is resumed. As a result, the braking stiffness BS is newly computed (S18), and the slip ratio speed reference value dSref/dt is computed on the basis of the newly computed braking stiffness BS and the braking force speed dFxcdt at the present point in time (S20).

In the case where the slip ratio speed dScF*/dt at the present point in time is smaller than the value ((dSrefF*/dt)−dSn) (S15: Yes), as described above, the brake ECU 10 corrects the braking stiffness BS (S21, S22). Meanwhile, in the case where the slip ratio speed dSc/dt at the present point in time is larger than the value ((dSref**/dt)+dSn)

(S14: Yes), the brake ECU 10 proceeds to step S23. In this case, since the target slip ratio flag Fst has been reset in the flag setting routine (Fst=0), the brake ECU 10 proceeds to step S24 and re-computes the target slip ratio Starget in accordance with the above-described Equation (9). After having re-computed the target slip ratio Starget in step S24, the brake ECU 10 sets the value of the target slip ratio flag Fst** to "1" in step S25.

In the above-described manner, the target slip ratio Starget is updated during performance of the ABS control. The target slip ratio Starget is re-updated only when the BS data detected flag FBS and the target slip ratio flag Fst are reset again upon satisfaction of the reset condition of step S33.

The brake control apparatus 1 of the present embodiment which has been described above achieves the following actions and effects.

1. The slip ratio speed reference value dSref/dt is obtained by dividing the braking force changing speed dFxc/dt by the braking stiffness BS, and a value obtained by adding the slip ratio speed noise offset value dSn to the slip ratio speed reference value dSref/dt is used as the slip ratio speed threshold. When the slip ratio speed Scdt exceeds the sip ratio speed threshold (dSref/dt+dSn), the ABS control is started. Accordingly, a variation in the slip ratio at the time of start of the ABS control can be reduced. Namely, it is possible to prevent the slip ratio at the time of start of the ABS control from varying with the speed with which the driver operates the brake pedal. Thus, the ABS control can be performed satisfactorily.

Figure 8:
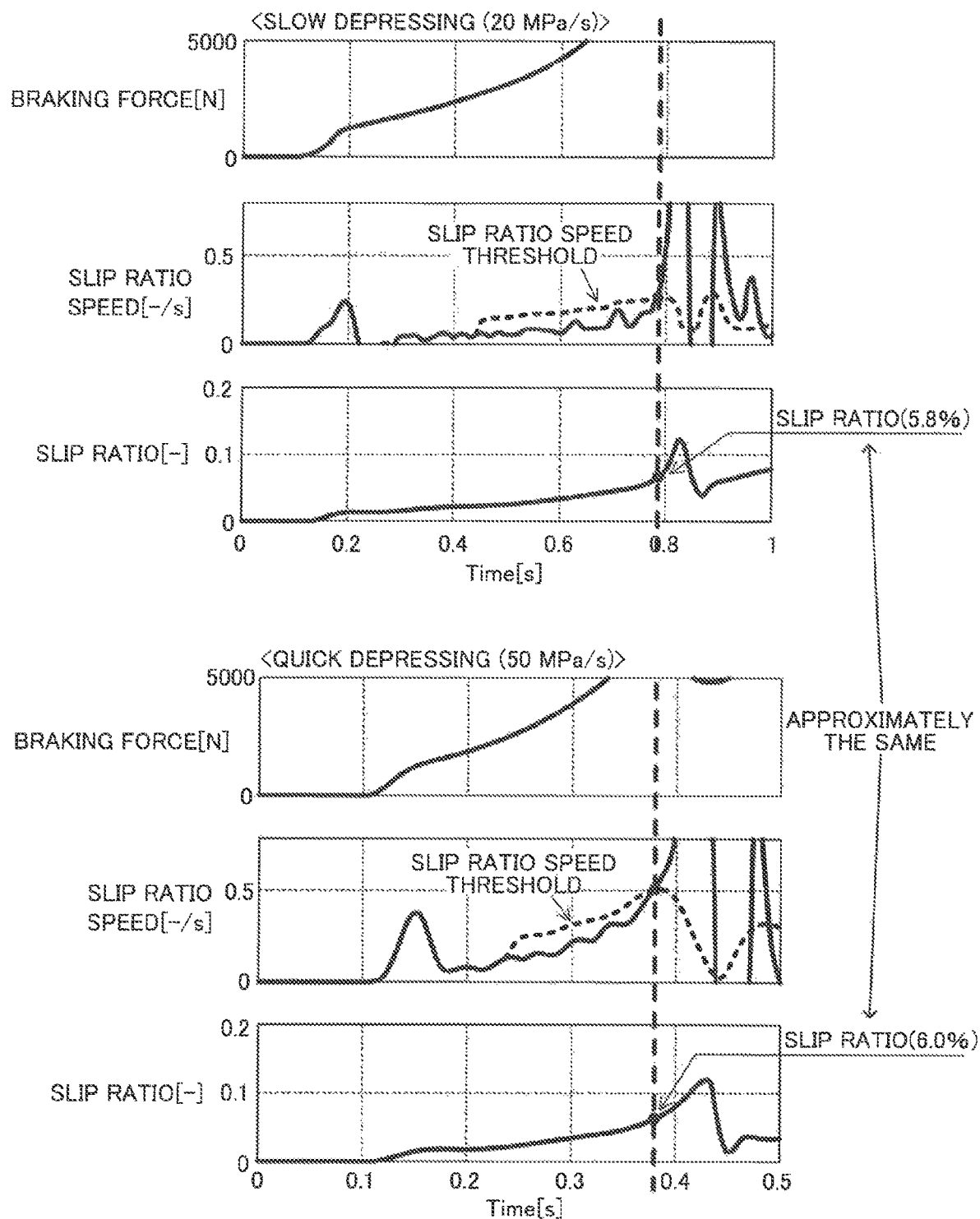
FIG. 8 is a set of graphs showing experimental data in the embodiment.
Figure 9:
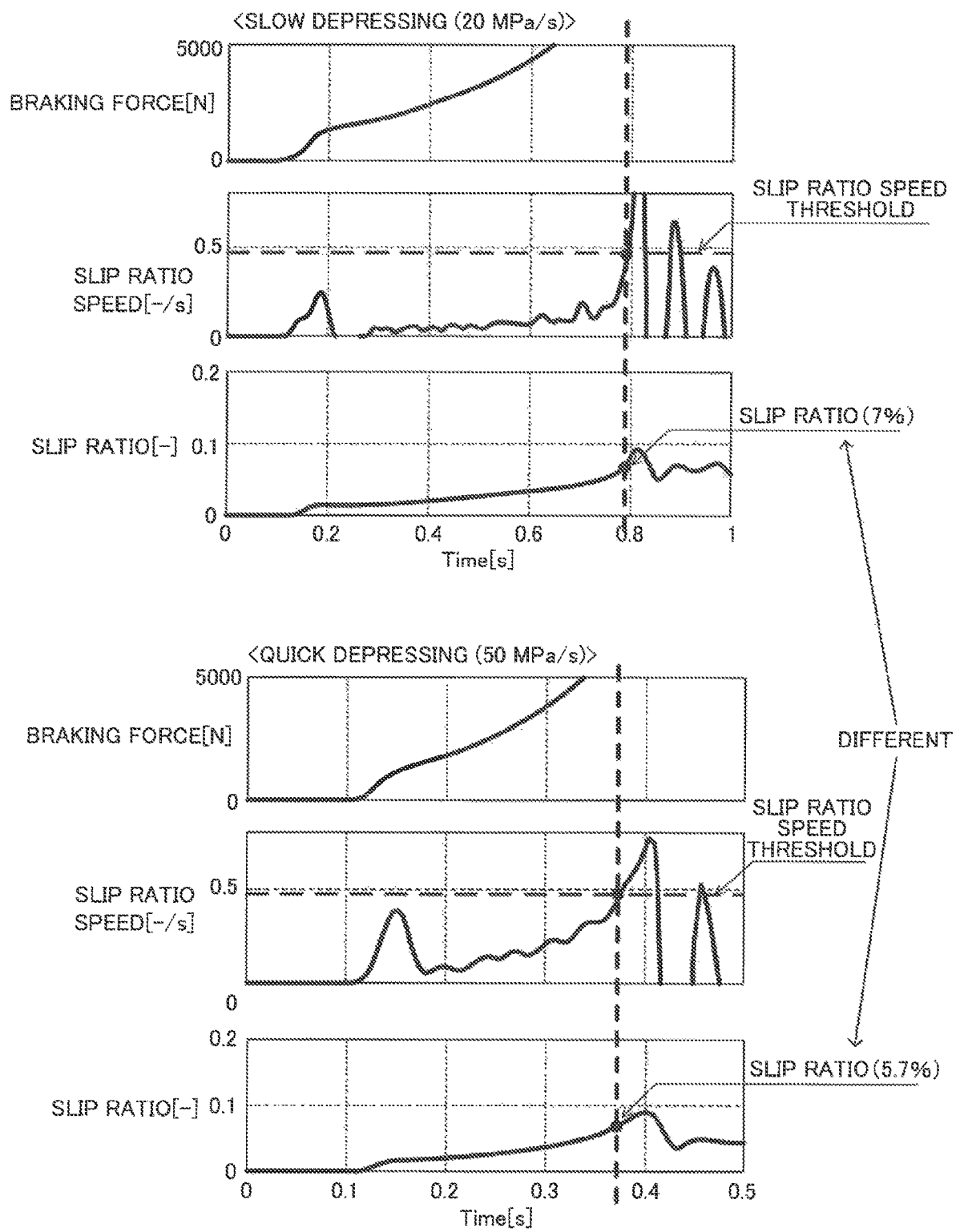
FIG. 9 is a set of graphs showing experimental data in a comparative example (the case where a fixed slip ratio speed threshold is employed).

FIG. 8 is a set of graphs showing experiment data (braking force, slip ratio speed, and slip ratio) in the embodiment. The graphs on the upper side show data in the case where the brake pedal was slowly depressed, and the graphs on the lower side show data in the case where the brake pedal was quickly depressed. In this experiment, the slip ratio speed threshold was variously set in accordance with the braking force speed as described above. FIG. 9 is a set of graphs showing experiment data (braking force, slip ratio speed, and slip ratio) in a comparative example. The graphs on the upper side show data in the case where the brake pedal was slowly depressed, and the graphs on the lower side show data in the case where the brake pedal was quickly depressed. In the comparative example, the slip ratio speed threshold was fixed to a certain value.

In the comparative example shown in FIG. 9, the slip ratio at the time of start of the ABS control was 7% in the case where the brake pedal was slowly depressed and was 5.7% in the case where the brake pedal was quickly depressed. Accordingly, the slip ratio at the time of start of the ABS control varies with the speed with which the driver operates the brake pedal. Meanwhile, in the embodiment shown in FIG. 8, the slip ratio at the time of start of the ABS control was 5.8% in the case where the brake pedal was slowly depressed and was 6.0% in the case where the brake pedal was quickly depressed. Accordingly, the slip ratio at the time of start of the ABS control is hardly affected by the speed with which the driver operates the brake pedal and does not vary.

2. When the slip ratio speed Sc/dt exceeds the slip ratio speed threshold (dSref/dt+dSn), the target slip ratio Starget (=Sc+Sp) is computed by adding the μ peak slip ratio offset Sp to the slip ratio Sc** at that time. Accordingly, it is possible to set an appropriate target slip ratio Starget* close to the μ peak slip ratio, whereby the ABS control can be performed more satisfactorily.

3. When the slip ratio speed ScF*/dt of the front wheel WF* becomes smaller than the predetermined value (dSrefF*/dt−dSn) after computation of the braking stiffness BS, the braking stiffness BS is corrected. Accordingly, the braking stiffness BS* after load shift can be obtained again. Then, the slip ratio speed threshold is re-computed on the basis of the corrected braking stiffness BS and the changing speed dFxc/dt of the braking force of the wheel at the present point in time. According, a more appropriate slip ratio speed threshold can be computed.

4. When the braking stiffness BS** is corrected, for the front wheels, the braking force FxcF* and the slip ratio ScF* are newly detected, and a new braking stiffness BSF* is computed on the basis of the detected braking force FxcF* and the detected slip ratio ScF*. Meanwhile, for the rear wheels, a new braking stiffness BSR* is computed by subtracting the correction amount BSadjF* of the braking stiffness of the front wheels from the value of the braking stiffness BSfirstR* of the rear wheels computed for the first time. Accordingly, the braking stiffness can be corrected appropriately for the rear wheels whose load decreases as a result of braking. As a result, a more appropriate slip ratio speed threshold can be computed.

5. In the case where the previously set reset condition (Sc<(Starget−Sdown)) is satisfied after the ABS control has been started, the braking stiffness BS is re-computed, and the slip ratio speed threshold (dSref/dt+dSn) is computed on the basis of the re-computed braking stiffness BS and the changing speed dFxc/dt of the braking force. Then, the target slip ratio Starget is set again on the basis of the slip ratio Sc at the time when the slip ratio speed dSc/dt has exceeded the slip ratio speed threshold (dSref/dt+dSn). Accordingly, the target slip ratio Starget** can be updated appropriately.

While the vehicular brake control apparatus of the embodiment has been described, the present invention is not limited to the above-described embodiment and may be embodied in various forms without departing from the scope of the invention.

For example, the vehicular brake control apparatus of the present embodiment is configured to set again the target slip ratio when the reset condition is satisfied during ABS control. However, the vehicular brake control apparatus is not necessarily required to have such a configuration. Namely, the vehicular brake control apparatus may be configured not to perform the flag setting routine.

The vehicular brake control apparatus of the present embodiment performs a process of correcting the braking stiffness; however, the vehicular brake control apparatus is not necessarily required to perform the correction process. For example, steps S15, S21, and S22 may be removed from the target slip ratio setting routine. Also, the braking stiffness is not necessarily required to be obtained through computation and may be a previously set value.

What is claimed is:

1. A brake control apparatus for a vehicle, comprising:
   slip detection means for detecting slip ratio of a wheel and slip ratio speed which is the rate at which the slip ratio changes;
   ABS control means, operable when the slip ratio speed exceeds a slip ratio speed threshold, for starting ABS control which adjusts braking force of the wheel such that the slip ratio of the wheel follows a target slip ratio;
   slip ratio speed threshold computation means for computing the slip ratio speed threshold on the basis of a changing speed of the braking force of the wheel at a present point in time and a braking stiffness representing the relation between the slip ratio of the wheel and the braking force of the wheel in a state in which the ABS control has not yet been started and the slip ratio of the wheel falls within a predetermined low slip ratio range; and braking stiffness computation means for computing the braking stiffness, wherein, the braking stiffness computation means is configured to obtain the slip ratio of the wheel and the braking force of the wheel at a timing when the slip ratio of the wheel has exceeded a previously set low slip ratio and determine the braking stiffness on the basis of a value obtained by dividing the braking force of the wheel by the slip ratio of the wheel.

2. The brake control apparatus for the vehicle according to claim 1, further comprising target slip ratio setting means for obtaining the slip ratio at the time when the slip ratio speed has exceeded the slip ratio speed threshold and setting the target slip ratio on the basis of the obtained slip ratio.

3. The brake control apparatus for the vehicle according to claim 1, wherein the slip ratio speed threshold computation means is configured to determine the slip ratio speed threshold on the basis of a value obtained by dividing the changing speed of the braking force of the wheel by the braking stiffness.

4. A brake control apparatus for a vehicle, comprising slip detection means for detecting slip ratio of a wheel and slip ratio speed which is the rate at which the slip ratio changes;

ABS control means, operable when the slip ratio speed exceeds a slip ratio speed threshold, for starting ABS control which adjusts braking force of the wheel such that the slip ratio of the wheel follows a target slip ratio;

slip ratio speed threshold computation means for computing the slip ratio speed threshold on the basis of a changing speed of the braking force of the wheel at a present point in time and a braking stiffness representing the relation between the slip ratio of the wheel and the braking force of the wheel in a state in which the ABS control has not yet been started and the slip ratio of the wheel falls within a predetermined low slip ratio range;

braking stiffness computation means for computing the braking stiffness; and braking stiffness correction means for correcting the braking stiffness computed by the braking stiffness computation means, wherein, after the braking stiffness is corrected by the braking stiffness correction means, the slip ratio speed threshold computation means computes the slip ratio speed threshold on the basis of the corrected braking stiffness and the changing speed of the braking force of the wheel at the present point in time.

5. The brake control apparatus for the vehicle according to claim 4, wherein, after the braking stiffness is computed by the braking stiffness computation means, for a front wheel, the braking stiffness correction means newly obtains the braking force and the slip ratio, and computes the braking stiffness on the basis of the braking force and the slip ratio newly obtained so that #the braking stiffness is corrected by a certain correction amount, and for a rear wheel, the braking stiffness correction means corrects the braking stiffness computed by the braking stiffness computation means, on the basis of the correction amount of the braking stiffness of the front wheel.

6. The brake control apparatus for the vehicle according to claim 4, further comprising target slip ratio setting means for obtaining the slip ratio at the time when the slip ratio speed has exceeded the slip ratio speed threshold and setting the target slip ratio on the basis of the obtained slip ratio.

* * * * *